July 11, 1939.  W. F. WESTENDORP  2,165,992
DYNAMIC BALANCING OF ROTATING BODIES
Filed Jan. 26, 1937
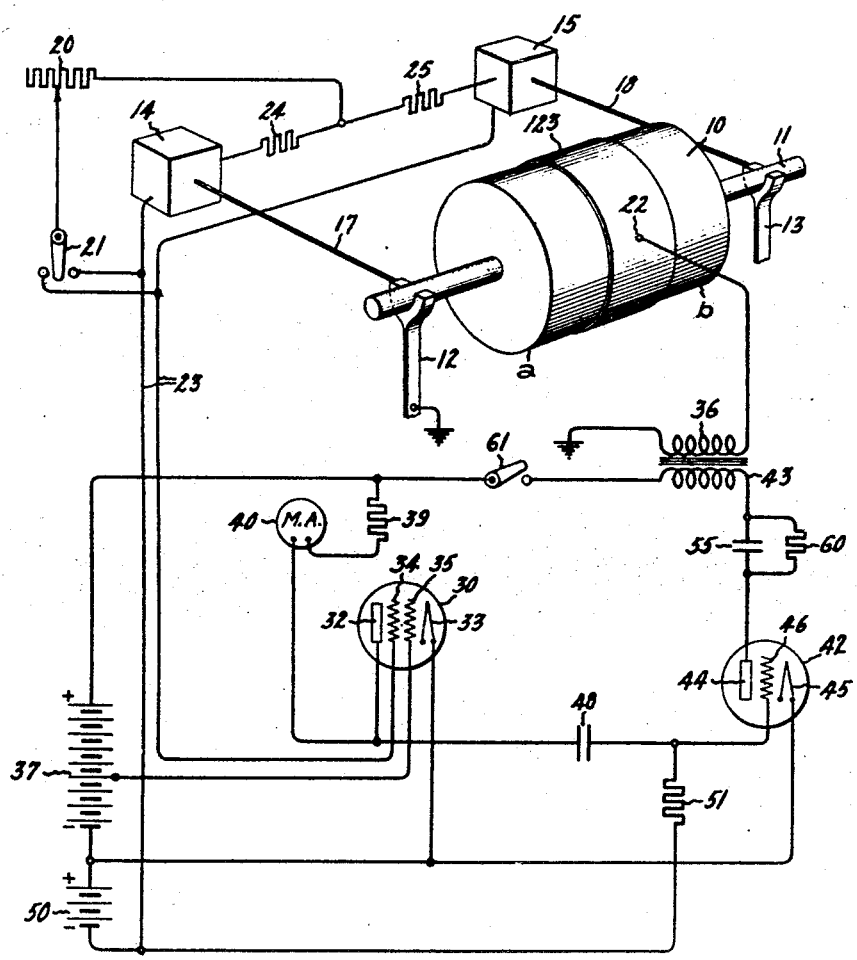
Inventor:
Willem F. Westendorp,
by Harry E. Dunham
His Attorney.

Patented July 11, 1939

2,165,992

UNITED STATES PATENT OFFICE 2,165,992

DYNAMIC BALANCING OF ROTATING BODIES

Willem F. Westendorp, Schenectady, N. Y., assignor to General Electric Company, a corporation of New York Application January 26, 1937, Serial No. 122,397

4 Claims. (Cl. 73—51)

The present invention relates to an improved method and means for analyzing and correcting the unbalance of rotating bodies such as electrical motor armatures.

The unbalance of a rotating body of substantial length may be regarded as being caused by a pair of separate masses eccentrically located in two axially spaced planes passing through the body. Furthermore, correction of the unbalance may be accomplished by the addition in each such plane of a corrective mass adapted to offset the unbalanced mass acting in that plane. While various devices are available for determining the amount and location of the unbalanced masses to be neutralized, those currently in use afford considerable opportunity for error in requiring numerous quantitative observations to be made and remembered by the operator.

It is an object of the present invention to provide an improved balancing apparatus and procedure whereby one of the significant quantities is automatically permanently recorded during the balancing operation, thus substantially simplifying the operator's task. According to the invention, this is accomplished by causing the various unbalanced masses to produce a visible and permanent index of their respective locations with respect to the surface of the body being tested. In a preferred embodiment a paper tape or other recording medium suitably secured to the test body is marked or punctured at points which are indicative of the location of these masses.

The features of novelty which I desire to protect herein are pointed out with particularity in the appended claims. The invention itself, however, may best be understood by reference to the following description taken in connection with the drawing in which the single figure represents diagrammatically a suitable mode of application of the invention.

As illustrated the test body comprises an elongated rotor 10 having a shaft 11 supported in such a way as to permit substantial vibration in the horizontal plane. Such support may be provided, for example, by flexible uprights which are identified by numerals 12 and 13 and which are positioned at the opposite ends of the rotor. The rotor end which is indicated by the letter $a$ may be arbitrarily called the "near end" of the rotor, while the end $b$ may be called the "far end". It will be assumed in the following that it is desired to balance the rotor 10 by resolving its total unbalance into components respectively associated with the "near end" and "far end", or with transaxial planes adjacent those ends.

The vibration in a horizontal plane produced by each of the separate unbalanced masses will be of substantially harmonic nature and will have a time phase of variation determined by the location of the mass causing it. Thus the velocity of horizontal motion of the support 12 produced solely by the unbalanced mass associated with the "near end" $a$ will be a minimum whenever the mass is in a horizontal position, either directly to the left or right of the shaft, and will be a maximum when the same mass is located in the vertical plane of the shaft.

From the foregoing it will be seen that if we can mark a point on the rotor which is passing through the horizontal plane at the time the velocity of vibration due solely to the "near end" unbalanced mass becomes zero, we shall have located angularly the position of that mass. Assuming also that the magnitude of the mass may be determined by observation of the magnitude of horizontal vibration which it causes, we shall be able to correct at least this one component of the rotor unbalance by adding to the rotor at the "near end" a balancing mass whose magnitude is equal to and whose direction of action is opposite to that of the determined unbalanced mass. A similar correction may then be made independently for the unbalanced "far end" mass.

In actual practice the analysis is further complicated by the fact that the vibrations occurring at either end of the rotor are caused not only by the unbalanced mass associated solely with that rotor end, but rather by the combined action of the two masses acting at both rotor ends. Consequently, in order to locate either of such masses by observations of the vibrations occurring at the adjacent rotor end, it is necessary to eliminate from such observations the effects of all but the selected mass. In the drawing I have illustrated means by which this result may be accomplished which means will now be described in detail.

Associated with each end of the rotatable body 10 there is provided a vibration responsive device, these devices being numbered 14 and 15 respectively. Such devices are well known in the art and may comprise, for example, relatively movable members of which one comprises an electro-magnetic coil adapted to generate periodic electrical impulses corresponding in time phase and magnitude to the variations in velocity of the vibrations to which the device is subjected. For this purpose I consider it desirable to use an electro-magnetic generator of the type specifically described and claimed in an application of E. L. Thearle, Serial No. 76,795, filed April 28, 1936, assigned to the same assignee as the present invention.

In the present instance the vibration responsive device 14 may be connected to the shaft support 12 by a link 17 while a corresponding link 18 may be provided between the device 15 and the support 13. Under these conditions each of the vibration responsive devices will produce a voltage, the magnitude and phase of which are determined essentially by the transaxial vibrations of the shaft end with which it is associated. In order to modify this voltage so that its phase and magnitude are determined solely by the components of vibration which are attributable to the unbalanced mass associated with only one of the rotor ends, various expedients are possible. I have illustrated, however, a particular arrangement which I consider suitable for the purposes of the present invention. In order to understand the operation of this arrangement it is desirable to describe in somewhat greater detail the nature of the various effects involved.

It has already been pointed out that the voltages developed by the respective vibration responsive device are each determined jointly by the unbalanced masses associated with the two rotor ends. Otherwise expressed, the output of each device contains components attributable to each of the unbalanced masses. To this may be added the fact, capable of being proved mathematically, that the effects produced in one vibration responsive device by either unbalanced mass are in opposite phase to the effects produced by the same mass in the other vibration responsive device. That is, the production of a positive impulse in one device is accompanied by a negative impulse produced by the same mass in the other device.

It is proposed herein to combine the outputs of the two vibration responsive devices in such a manner that separate effects produced by the unbalanced mass associated with a selected rotor end shall cancel one another. This may be accomplished, for example, by connecting in series with one device, say the device 14, a voltage which comprises a properly chosen percentage of the output of the other device.

In accordance with the arrangement of the drawing the electrical connections to the vibration responsive devices 14 and 15 are such as to place both of the devices in series with a measuring circuit (to be described more fully hereinafter). There is further provided an adjustable resistance 20 so connected that it may be placed in shunt with either of the vibration responsive devices at the option of the operator. The selection of connections may be governed, for example, by a manual switch 21 which in the left-hand position places the resistor 20 in shunt with the device 15 and the in right-hand position places it in shunt with the device 14. With the switch 21 in either of its closed positions the voltage impressed on the terminal connections 23 will represent the sum of the output of one of the vibration responsive devices plus a certain fraction of the output of the shunted device. The magnitude of this last specified fraction will depend upon the value of the resistance 20 and the relation which that value bears to the internal resistance of the shunt device. (In the drawing the internal resistances of the vibration responsive devices are indicated respectively by separate resistance elements 24 and 25.) A value of the resistance 20 may be found to be such that in the voltage impressed on the terminal connections 23 the separate effects of the unbalanced mass associated with the "far end" b, as manifested in the respective outputs of the devices 14 and 15, will have canceled one another, and the voltage applied to the terminal connections 23 will be a function solely of the unbalanced mass associated with the rotor "near end" a. The proper resistance adjustment may be made, for example, by experimentation with a rotor whose balance or lack of balance has been determined beforehand by other means. Once it has been established for a given rotor, it will be a constant value for all other rotors of the same size and type.

With the specified conditions established, the output of the generator 14 will be a sinusoidally varying voltage whose time phase is determined solely by the location of the unbalanced mass associated with the "near end" a of the rotor. In order to determine this location in accordance with the principles outlined above it is only necessary to ascertain the position of some point on the rotor circumference at the time this voltage passes through a maximum or a minimum. To this end there is provided in connection with the rotor a recording surface and means for producing a mark thereon in the horizontal plane of the rotor at the time the generator voltage becomes zero. It will be understood that such a mark, once produced, will be a direct index of the location of particular unbalance mass being studied.

Various instantaneously acting devices may be employed as marking agents, and the particular one which I have illustrated should be regarded as exemplary only. This comprises a sparking electrode 22 adapted to be energized at a desired instant to produce a trace or hole in a cooperating recording surface. As illustrated such a surface may comprise a band or ribbon 123 of insulating material such as paper applied to the rotor circumference and adapted to be punctured by the action of the sparking electrode. The sparking circuit which makes this possible comprises an inductive winding 36 and connections from opposite ends of this winding through ground to the rotor support 12 and to the sparking electrode 22.

In order to control the energization of the sparking electrode in accordance with the phase angle of the voltage of the generator 14 there is futher provided a triggering circuit, the details of which are as follows:

The control voltage as impressed on the terminal connections 23 is first amplified by means such as the vacuum discharge device 30. This device may suitably comprise a four-element tube provided with an anode 32, a cathode 33, a control grid 34 and a screen grid 35. It is preferably operated in such a manner that the plate voltage increases and decreases abruptly in response to variations in control potential so that an output of sharp wave form is obtained.

The main supply potential for the amplifier may suitably comprise a battery 37 having its potential impressed between the anode 32 and the cathode 33 in series with a current-limiting resistance 39 and a milliampere meter 40. The screen grid 35 is maintained at a fixed potential with respect to the cathode by appropriate connection to an intermediate portion of the battery, while the potential of the control grid 34 is varied in accordance with the periodic impulses derived from the vibration responsive devices 14 and 15 as previously described.

The energy supply to the winding 36 is directly controlled by means of a triggering device 42 connected in series with a second winding 43 which is inductively coupled with winding 36. The triggering device may comprise, for example, a discontinuously controlled discharge tube, by which term I intend to designate a tube which may be rendered initially conductive by the action of a control grid but whose conductivity may be terminated only by a reversal of the discharge potential. In the present instance the particular tube illustrated is shown as comprising an anode 44, a cathode 45, and a control electrode 46; these elements being adapted to operate in the presence of an ionizable medium.

The energy supply for the discharge tube 42 and the inductive winding 43 comprises the battery 37 already referred to. The control potential for the grid 46 is obtained by coupling the grid to the anode 32 of the amplifier 30 by means of a condenser 48. Under normal conditions the tube 42 is maintained non-conductive by means of a biasing potential impressed on the grid 46 by a battery 50 in series with a resistance 51.

As a result of the arrangement so far described, when the amplifier 30 becomes suddenly fully conductive in response to a positive half wave of control voltage, the anode 32 and the plate of the condenser 48 attached thereto will suddenly decrease in voltage with respect to the cathode 33 by an amount equal to the potential drop across the resistance 39. Furthermore, as far as the cathodes 33 and 45 are concerned, this same decrease will also be sustained by the condenser plate which is attached to the grid 46. In the short interval before the anode potential is again abruptly restored by the action of the control voltage in approaching and passing through its zero value in the negative direction, the voltage of the grid 46 will rise a definite amount because of loss of the condenser charge by leakage through the resistance 51. Consequently, when the voltage of the anode 32 again rises abruptly as a result of a negative control impulse, the grid 46 will be driven positive with respect to its normal value by such definite amount. With the proper correlation of circuit constants this amount may be made just sufficient to cause the tube 42 to be rendered conductive and the sparking circuit to be energized. This energization will be substantially coincident with the passage of the control impulse through its zero value, and the index mark produced on the recording surface 123 will accordingly be indicative of the location of the unbalanced mass under investigation.

The sparking impulse may be made of very short duration by appropriate arrangement of the circuit associated with the inductive winding 43. For example, there may be connected in series with the winding a condenser 55 of such value that the combination forms an oscillatory circuit having a very high natural frequency. Consequently, the initial surge of current in the positive direction through the tube 42 will be almost instantaneously followed by an attempted surge in the opposite direction. This attempted surge will of course be blocked by the unidirectional characteristic of the tube and will serve to interrupt the current flow. In connection with the condenser 55 there is provided a leakage resistance 66 of such value that the charges accumulated thereon may be drained before the commencement of the succeeding cycle of operation as determined by the frequency of the control voltage derived from the terminal connections 23. Consequently, the apparatus will be ready for a second sparking operation almost immediately.

In utilizing my invention in balancing operations the operator will throw the switch 21 either to the right or to the left and will adjust the resistance 20 to the value appropriate to eliminate the effects of all but one unbalanced mass. Thereafter with the rotor 10 running at a desired speed the combined output of the vibration responsive devices is impressed on the triggering circuit by suitable switching means such as a keying device 61. The magnitude of the vibration and, consequently, of the particular unbalanced mass under investigation may be determined in various ways as, for example, by observing on the milliameter 40 the value of the plate current passing through the amplifier 30. In order to discover the location of the unbalance, the rotor may be stopped and the position of the index mark or puncture noted. If desired, the operator may make a notation adjacent this index mark to designate the rotor end to which it refers.

Thereafter the rotor may be restarted, and with the switch 21 thrown to its opposite position, similar observations may be made to determine the amount and location of the unbalance mass associated with the other rotor end. In correcting the unbalance, the proper location of corrective weights is determinable simply by reference to the permanent record produced on the recording surface 123. All that is required of the operator is to remember the unbalance amounts as read on the meter 40 and to apply appropriate weights to the respective rotor ends in alinement with the index marks formed by the puncturing electrode.

While I have described my invention in connection with a particular structure and circuit arrangement, many modifications may be made by those skilled in the art without departing from the invention. I, therefore, aim in the appended claims to cover all such equivalent modifications as come within the true spirit and scope of the foreign disclosure.

What I claim as new and desire to secure by Letters Patent of the United States is:

1. Apparatus for analyzing the unbalance of a rotatable body including the combination of means rotatably supporting the body to permit substantial vibration thereof under the action of unbalanced masses in the body, a vibration responsive device operatively associated with the body for generating periodic impulses timed in accordance with its vibrations, and means dependent on the timing of such impulses for producing on or in connection with the surface of the body a permanent visible indication of the angular location of the unbalanced masses.

2. Apparatus for analyzing the unbalance of a rotatable body including the combination of means rotatably supporting the body to permit substantial vibration thereof under the action of unbalanced masses in the body, means for generating periodic impulses timed in accordance with vibrations produced solely by the unbalanced mass associated with a selected transverse radial plane in the body, and means actuable in accordance with the timing of said impulses for producing on or in connection with the surface of the body a visible mark whose position is indicative of the location of said unbalanced mass in said plane.

3. Apparatus for analyzing the unbalance of a rotatable body including the combination of means rotatably supporting the body to permit substantial vibration thereof under the action of unbalanced masses in the body, means for generating periodic impulses timed in accordance with vibrations produced solely by the unbalanced mass associated with a selected transverse radial plane in the body, a recording surface comprising a band of insulating material arranged circumferentially on said body, and means for producing on said surface a visible mark whose position is indicative of the location of said unbalance masses in said plane, said means including a sparking electrode arranged adjacent said recording surface and an electrical circuit for energizing said electrode in accordance with the timing of said impulses.

4. Apparatus for analyzing the unbalance of a rotatable body including the combination of means for rotatably supporting the body to permit substantial vibration thereof under the action of unbalanced masses in the body, means for generating periodic impulses in accordance with certain vibrations of the body, and means for producing on or in connection with the surface of the body a visible mark whose position is indicative of the location of the unbalanced masses producing said certain vibrations, said means comprising a sparking electrode arranged adjacent the surface of the body, and means for energizing said electrode in accordance with the timing of said impulses.

WILLEM F. WESTENDORP.